United States Patent
Zweighaft

[11] Patent Number: 6,134,072
[45] Date of Patent: Oct. 17, 2000

[54] TRACKING OF NON-NATIVE STRIPES IN HELICAL SCAN TAPE DRIVE

[75] Inventor: James Zweighaft, Boulder, Colo.

[73] Assignee: Exabyte Corporation, Boulder, Colo.

[21] Appl. No.: 08/826,055

[22] Filed: Mar. 26, 1997

[51] Int. Cl.[7] .................................. G11B 5/584
[52] U.S. Cl. ....................................... 360/77.13
[58] Field of Search .................. 360/75, 76, 77.12, 360/77.01, 77.13, 78.02, 77.06, 77.16

[56] References Cited

U.S. PATENT DOCUMENTS

| | | | |
|---|---|---|---|
| 4,055,849 | 10/1977 | Hickok | 360/77.13 |
| 4,204,234 | 5/1980 | Noble | 360/77.13 X |
| 4,298,897 | 11/1981 | Arter et al. | 360/77.13 X |
| 4,953,161 | 8/1990 | Toyama | 360/77.01 X |
| 5,050,018 | 9/1991 | Georgis et al. | |
| 5,146,373 | 9/1992 | Wakui et al. | 360/77.01 |
| 5,181,146 | 1/1993 | Koga | 360/77.16 X |
| 5,210,663 | 5/1993 | Nakase et al. | 360/77.16 |
| 5,241,434 | 8/1993 | Okamoto et al. | 360/77.16 X |
| 5,274,515 | 12/1993 | Furuyama | 360/77.16 |
| 5,349,481 | 9/1994 | Kauffman et al. | |
| 5,535,068 | 7/1996 | Hughes | 360/73.04 |
| 5,602,694 | 2/1997 | Miles et al. | |
| 5,680,269 | 10/1997 | Georgis et al. | 360/73.12 |

FOREIGN PATENT DOCUMENTS

| | | |
|---|---|---|
| WO 95/13606 | 5/1995 | WIPO . |
| WO 95/13615 | 5/1995 | WIPO . |

*Primary Examiner*—Paul Loomis
*Assistant Examiner*—Kin Wong
*Attorney, Agent, or Firm*—Nixon & Vanderhye, P.C.

[57] ABSTRACT

A tracking method enables a first read head (R1) and a second read head (R2) of a helical scan tape drive (30) to read non-native helical stripes, the non-native helical stripes being wider than native stripes. Read signals from the first read head (R1) and the second read (R2) head which are acquired from the non-native tracks are used to determine a correction value. The correction value is in turn used to control a relative position of the first read head (R1) and the second read head (R2) over the non-native helical stripes.

20 Claims, 7 Drawing Sheets

Track 1    Track 2

Optimal Tracking

Positive Tracking Error

Negative Tracking Error

Large Negative Tracking Error

Large Positive Tracking Error

TRACKING OF NON-NATIVE STRIPES IN HELICAL SCAN TAPE DRIVE

BACKGROUND

1. Field of Invention

This invention pertains to the recording of information on magnetic tape using magnetic tape drives, and particularly to a tracking technique enabling reading of non-native formatted stripes.

2. Related Art and Other Considerations

For decades magnetic tape has been employed as a medium for storing information. Devices known as tape drives, tape decks, or tape recorders perform input and output operations, e.g., reading and recording operations, by transducing information from and to the tape. Information to be stored on a tape is obtained from a host device such as a computer. The information is transmitted from the host over a special connection or bus, e.g., SCSI bus, to the tape drive. Typically the tape drive has a buffer memory for temporarily storing information obtained from the host which the drive is not quite ready to record on the tape. When the information is ready to be recorded, the information passes through a write channel of the tape drive to a write head. The head has gaps or other appropriate elements thereon which form magnetic flux transitions on the tape in the recording operation.

A reading operation for a tape drive is essentially the reverse of the recording operation. In the reading operation, the read head detects magnetic flux transitions on the tape to obtain a read signal, processes the signal in read circuitry, stores information ascertained from the read circuitry in the buffer, and ultimately transmits the information to a utilization device, e.g., the host, over the bus which connects the host and the tape drive.

One type of magnetic recording is helical scan recording. In helical scan recording, one or more head(s) are mounted on a rotating drum. The tape is transported past a portion of the periphery of the rotating drum so that, as the head on the drum contacts the tape, a stripe or track is recorded on the tape at an angle to the direction in which the tape is transported. The tape is transported through a tape path, which includes around the periphery of the drum, from a tape supply reel to a tape take-up reel. In some magnetic tape drives, a capstan is utilized to impart linear velocity to the tape. By contrast, a capstanless helical scan tape drive is shown in U.S. Pat. No. 5,602,694 for CAPSTANLESS HELICAL DRIVE SYSTEM to Robert J. Miles and James Zweighaft, which is incorporated herein by reference.

In order for the head(s) of the tape drive to follow the helically recorded stripes, a stripe tracking system must be provided. Many previous helical scan tape drives have tracking systems based on special recorded signals intermixed with data and formatting signals. These are usually referred to as "pilot" or "tracking" signals. The tracking schemes are all based on reading the amplitude of these signals, which varies with the position of the read head relative to the pilot signal. When a read head sweeps directly over a pilot signal, a large amplitude is reproduced. If the read head is off center so that it does not pass completely over the pilot signal, a lesser amplitude is reproduced.

The pilot signals can be of a frequency within the range of data, or at a lower or higher frequency. Low frequency signals may be read by a head using a different gap angle than the track itself. Such a situation is well known to those skilled in the art as 'off azimuth' reading. Some systems employ a dedicated servo head whose sole function is to read the pilot signal amplitude.

Various methods are employed to determine the optimal time to sample the amplitude, usually based on a time delay from a synchronizing signal on the tape or an index pulse on the rotating scanner.

As technology advances, particularly the science of manufacturing heads with smaller gaps, helical stripes are becoming narrower. While advantageously generally, the narrowing of gaps and stripes presents a problem when using a narrow gapped-head to read a broader stripe recorded by an older tape drive.

As an example of the foregoing, a tape drive manufactured by Exabyte Corporation as the Mammoth¤™ tape drive records data tracks that are 11.5 μm wide. To do this, it employs two write heads which are spaced apart by that distance. For playback, there are also two read heads, also spaced 11.5 μm apart. In order to allow for some error in the position of the read heads on playback, the read heads are made somewhat wider than the track pitch. Signal pickup from the adjacent tracks are greatly attenuated by use of the well known dual azimuth scheme. In the dual azimuth scheme, the odd and even tracks are written using different gap angles.

Difficulties arise when the Mammoth¤™ drive described above attempts to read other tracks formats, which can vary not only in track width, but also in frequency and spacing of pilot signals, use of a guard band and numerous other factors. One particular case of interest is occurs when the Mammoth¤™ drive attempts to read a format of tape recorded by an EXB®-8500 model tape drive, manufactured by Exabyte Corporation. Information regarding the EXB®-8500 model tape drive is disclosed e.g, in U.S. Pat. Nos. 5,142,422; 5,065,261; and 5,068,757, all of which are incorporated herein by reference.

Because the track width on the EXB®-8500 format is different than the spacing between the two Mammoth read heads, it is not possible to have both read heads centered over two 8500 tracks simultaneously. The tracks of the EXB®-8500 are nominally 15.5 um wide with no guard band between them, while the Mammoth¤™ read heads are separated by 11.5 um.

What is needed therefore, and an object of the present invention, is a method and apparatus for enabling a helical scan tape drive with narrow head gaps to read stripes recorded differently, e.g, with broader head gaps.

SUMMARY

A tracking method enables a first read head and a second read head of a helical scan tape drive to read non-native helical stripes, the non-native helical stripes being wider than native stripes. Read signals from the first read head and the second read head which are acquired from the non-native tracks are used to determine a correction value. The correction value is in turn used to control a relative position of the first read head and the second read head over the non-native helical stripes.

Determining the correction value primarily comprises: (1) interpreting any signal loss from the first read head as meaning that the first read head and the second read head are positioned too far to a first direction; and (2) interpreting any signal loss from the second read head as meaning that the first read head and the second read head are positioned too far to a second direction.

The operating range of the method can be extended by incorporating a second term under extreme misalignment conditions: (1) If the signal amplitude from the channel 1 head drops below a predetermined threshold, any signal loss (meaning that the present amplitude less than the observed maximum) from the channel 2 read head is added to the correction equation with it's sign inverted. When the output from the channel 2 is below the stated threshold, and the output from channel 1 is below it's maximum observed value, the correction factor is increased by a second term proportional to the drop in channel 1 amplitude. The sign of this second term is opposite the sign used in the case of small positive tracking errors. In an similar fashion, if the signal amplitude from the channel 2 head drops below a predetermined threshold, any signal loss (meaning the present amplitude less than the observed maximum) from the channel 1 read head is added to the correction equation with it's sign inverted.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
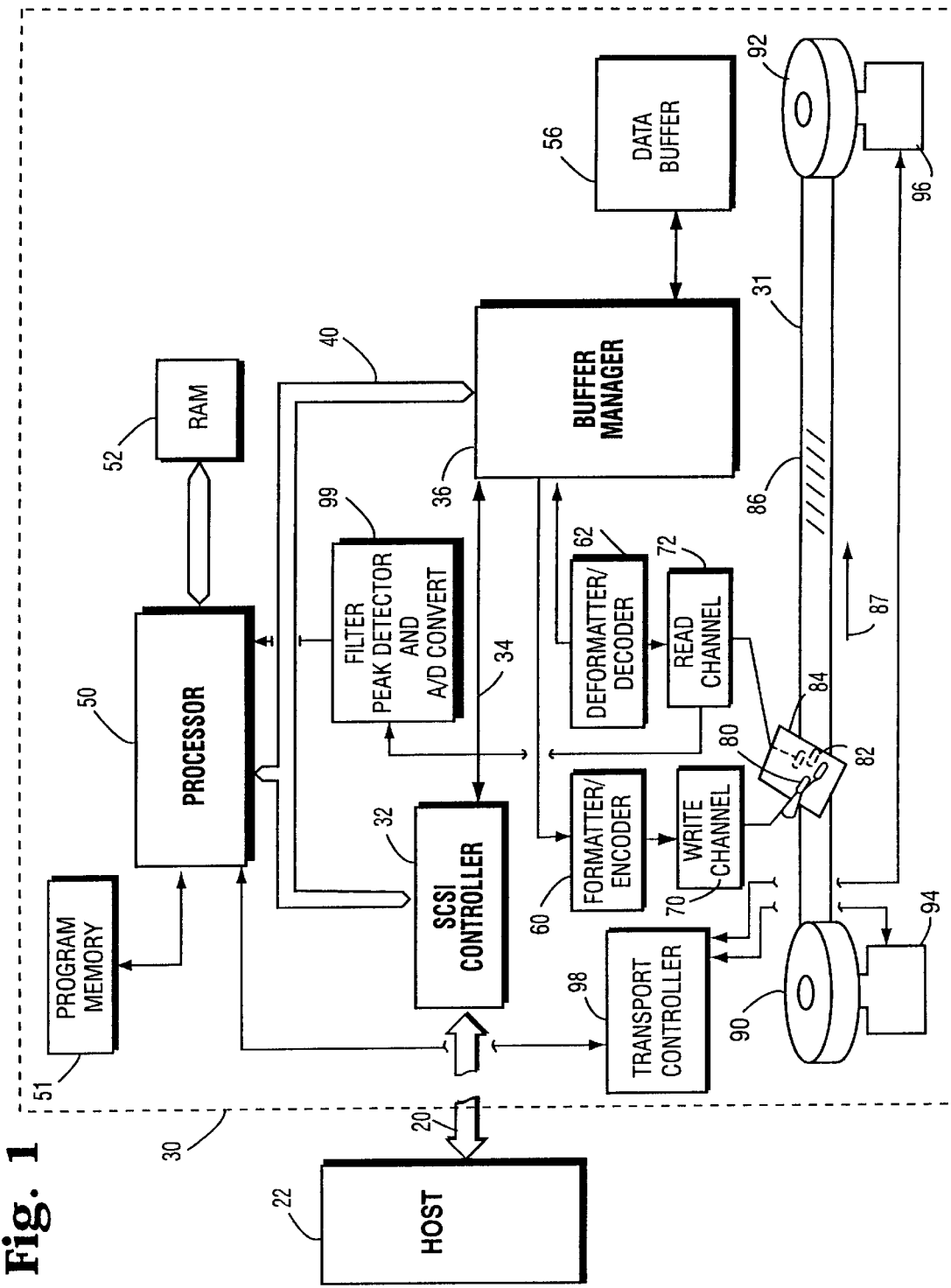
FIG. 1 is a schematic view of a tape drive according to the present invention, the tape drive being connected to a host.

FIG. 1 shows a SCSI bus 20 which connects a host computer 22 and a SCSI target storage device, particularly tape drive 30. In the illustrated embodiment, tape drive 30 is a helical scan tape drive such as a Mammoth™ tape drive manufactured by Exabyte Corporation which transduces information on/from 8 mm tape 31. Tape drive 30 includes a SCSI controller 32 which is connected to SCSI bus 20. Data bus 34 connects SCSI controller 32 to buffer manager 36. Both SCSI controller 32 and buffer manager are connected by a bus system 40 to processor 50. Processor 50 is also connected to program memory 51 and to a data memory, particularly PAM 52.

Buffer manager 36 controls, e.g., both storage of user data in buffer memory 56 and retrieval of user data from buffer memory 56. User data is data from host 22 for recording on tape 31 or destined from tape 31 to host 22. Buffer manager 36 is also connected to formatter/encoder 60 and to deformatter/decoder 62. Formatter/encoder 60 and deformatter/decoder 62 are, in turn, respectively connected to write channel 70 and read channel 72. Write channel 70 is connected to two recording elements or write heads 80; read channel is connected to two read elements or read heads 82.

In the illustrated embodiment, write head(s) 80 and read head(s) 82 are situated on a peripheral surface of rotating drum 84. Read heads 82 are 180 degrees apart from write heads 80 about the axis of the drum. Tape 31 is wrapped around drum 84 such that head(s) 80 and 82 follow helical stripes 86 on tape 31 as tape 31 is transported in a direction indicated by arrow 87 from a supply reel 90 to a take-up reel 92. Supply reel 90 and take-up reel 92 are typically housed in an unillustrated cartridge or cassette from which tape 31 is extracted into a tape path that includes wrapping around drum 84. Supply reel 90 and take-up reel 92 are driven by respective reel motors 94 and 96. Reel motors 94 and 96 are driven by transport controller 98, which ultimately is governed by processor 50. Operation and control of the tape transport mechanism including reel motors 94 and 96 is understood by the person skilled in the art with reference, for example, to U.S. patent application Ser. No. 08/337,620 for METHOD AND APPARATUS FOR CONTROLLING MEDIA LINEAR SPEED IN A HELICAL SCAN RECORDER, filed Nov. 10, 1994 and incorporated herein by reference.

Those skilled in the art will appreciate that write channel 70 includes various circuits and elements including a RLL modulator, a parallel-to-serial converter, and write current modulator. Similarly, the person skilled in the art understands that read channel 72 includes a data pattern and clock recovery circuitry, a serial-to-parallel converter, and, an RLL demodulator. These and other aspects of tape drive 30, including servoing, error correction, are not necessary for an understanding of the invention and accordingly are not specifically described herein.

Read channel 72 is not only connected to deformatter 62, but also to a filter, peak detector, and analog to digital (ADC) converter circuit 99. Circuit 99 is, in turn, connected to processsor 50, for applying signals indicative of values read from the two read heads, specifically hereinafter labeled as read head R1 and read head R2, to processor 50.

Figure 7:
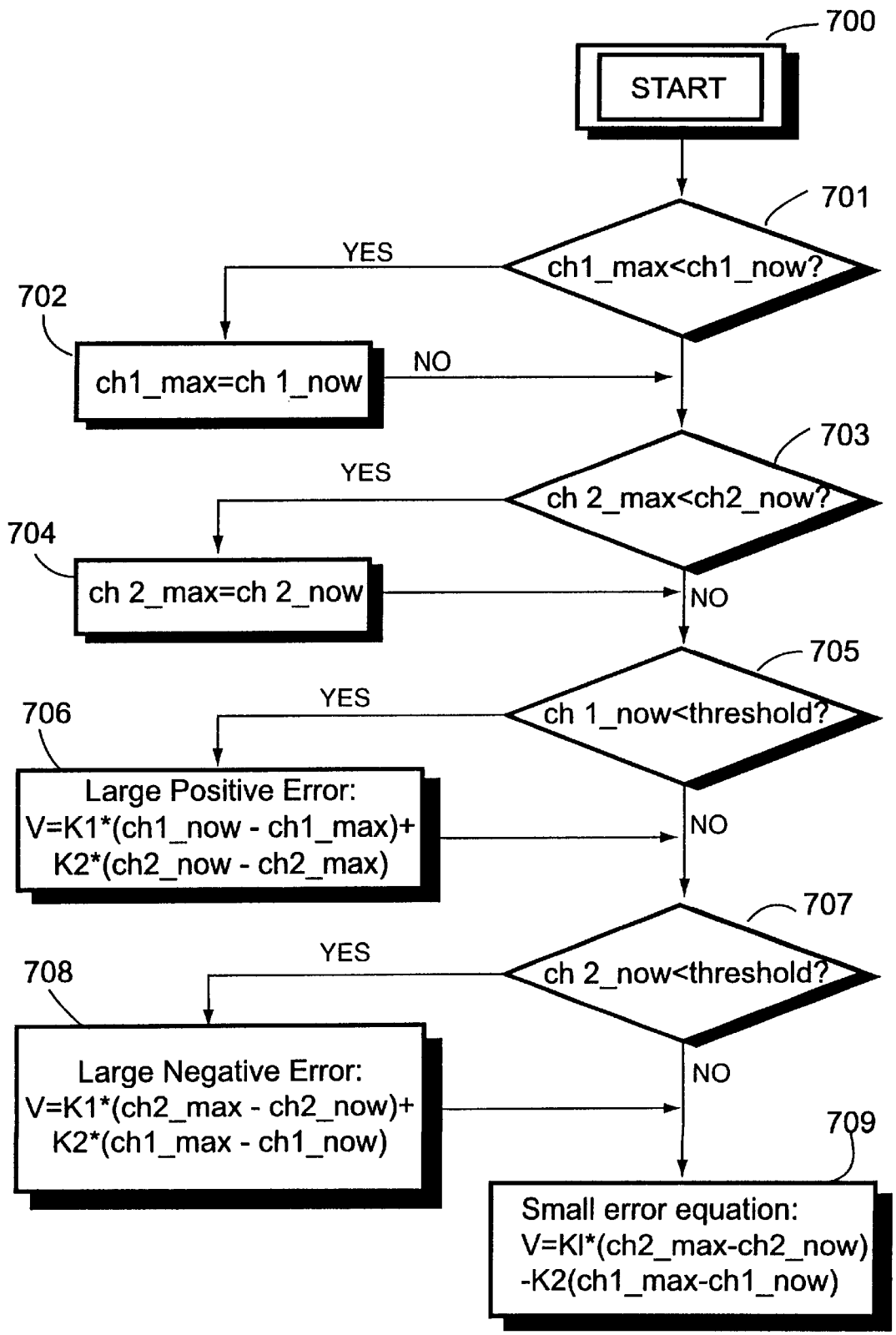
FIG. 7 is a flowchart showing steps executed in accordance with the present invention.

Program memory 51 has stored therein a set of coded instructions which are executed by processor 50. FIG. 7 shows operations performed by processor 50 in connection with the present invention. It should be understood that processor 50 performs many operations other than those illustrated in FIG. 7 in connection with control of tape drive 30, but for sake of clarity only those pertinent to the present invention are described herein.

As mentioned above, the Mammoth™ tape drive has two read heads 82 which also spaced apart at the track pitch, i.e., 11.5 um apart. Read heads 82 have gaps which are somewhat wider than the track pitch. FIG. 2 through FIG. 6 show how the two Mammoth™ read heads 82, also referenced as R1 and R2, can be positioned along two tracks of another format having a greater pitch than 11.5 um, particularly two non-native formatted tracks (e.g., tracks recorded by an EXB®-8500 model tape drive). In FIG. 2 through FIG. 6, the relative motion between the heads and the track is such that the heads move parallel to the track edges. The two read heads do not move relative to each other as they are both fixed on the periphery of a rotating scanner. It should be understood that the pattern of tracks repeats on both sides of the two tracks shown.

Figure 2:
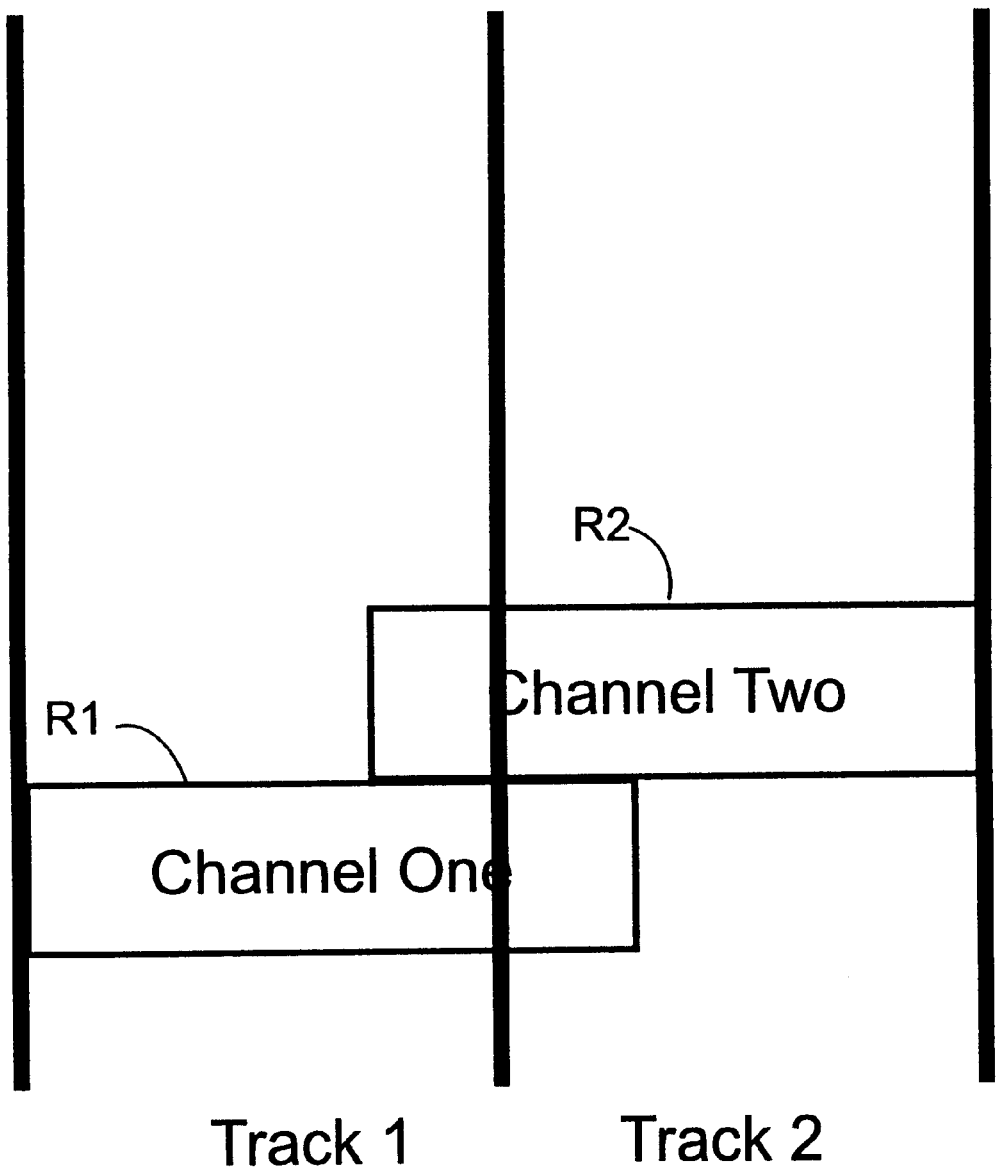
FIG. 2 is a schematic view of read heads of a narrow stripe format helical scan recorder following tracks of a broader stripe format helical scan recorder in an optimal tracking condition.

Referring to FIG. 2, it is possible to position the pair of read heads R1, R2 over a pair of non-native formatted tracks, such that the left side of read head R1 lines up with the left edge of non-native Track 1, while the right side read head R2 lines up with the right edge of non-native Track 2. In FIG. 2, the right edge of the read head R1 overlaps the non-native Track 2 by nominally 2.5 um, and the left side of read head R2 overlaps non-native Track 1 by the same amount. If this alignment can be maintained, the non-native formatted tracks could be read. This alignment of heads to tracks in FIG. 2 is, in fact, an optimal tracking condition. However, any deviation in the alignment of FIG. 2 results in a loss of signal from one or the other of the read heads R1, R2. This contrasts with most formats that provide some overlap of the heads on both sides of the tracks, so that small misalignments in either direction do not result in a loss of signal amplitude.

In general, pilot signal tracking schemes seek to balance the output of read heads at certain locations on tape because that corresponds to having the heads centered over their respective tracks. However, this particular pilot signal tracking scheme is inapplicable in the case of the drive 30 attempting to read a non-native formatted tape. If read head R1 were directly over the non-native Track 1, read head R2 would be well off center of non-native Track 2, resulting in severe signal loss. Signal loss is defined as any drop of signal amplitude from the observed maximum value, which is measured on an ongoing basis as shown in FIG. 7, steps 701–704.

Figure 3:
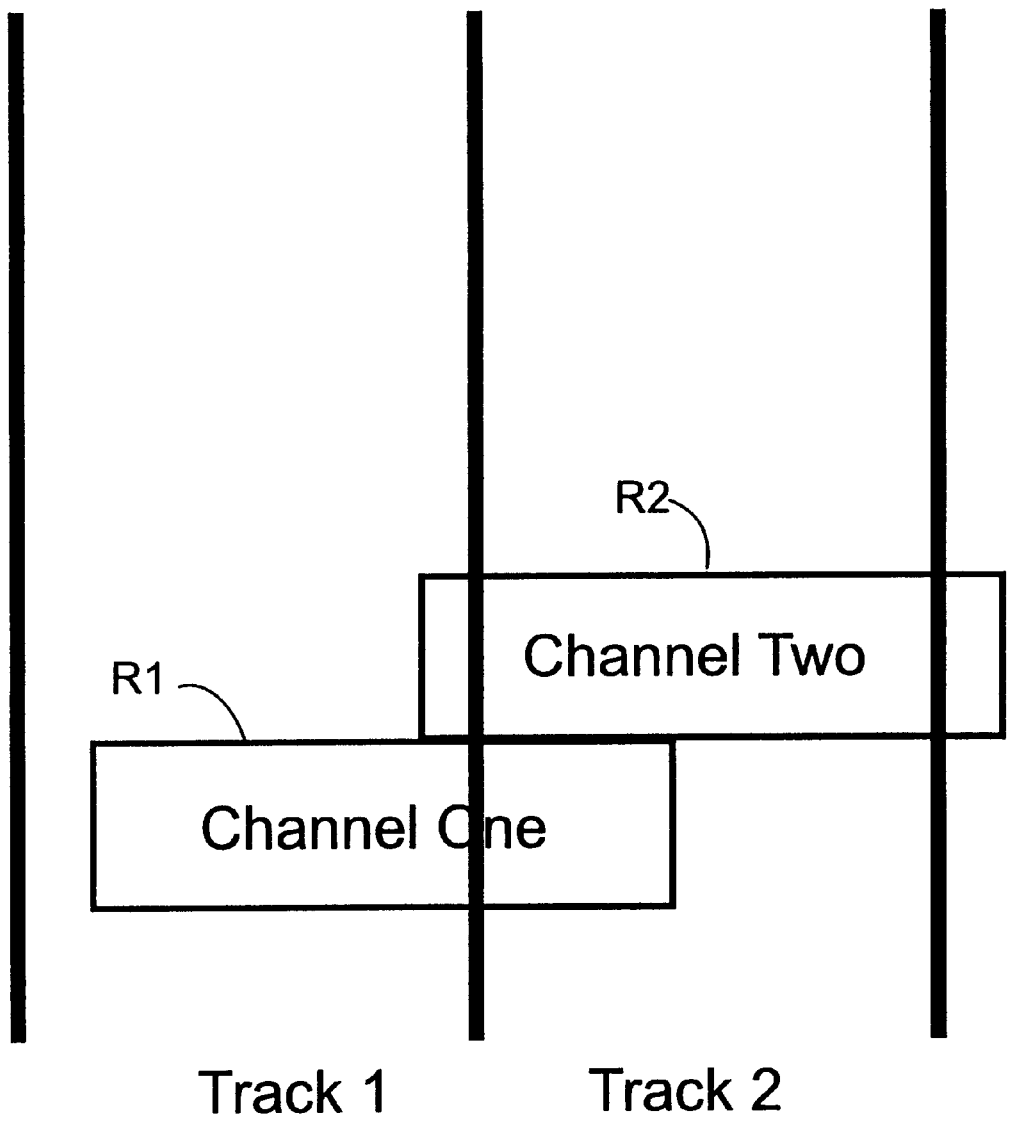
FIG. 3 is a schematic view of read heads of a narrow stripe format helical scan recorder following tracks of a broader stripe format helical scan recorder in a positive tracking error condition.

In accordance with the present invention, read heads R1, R2 read non-native tracks by combining the signals from heads R1, R2 in a novel way. In particular, the present invention implements a primary tracking rule as follows:

(1) Any signal loss from read head R1 is interpreted as meaning that heads R1, R2 are positioned too far to the right (see the positive tracking error condition depicted in FIG. 3).

Figure 4:
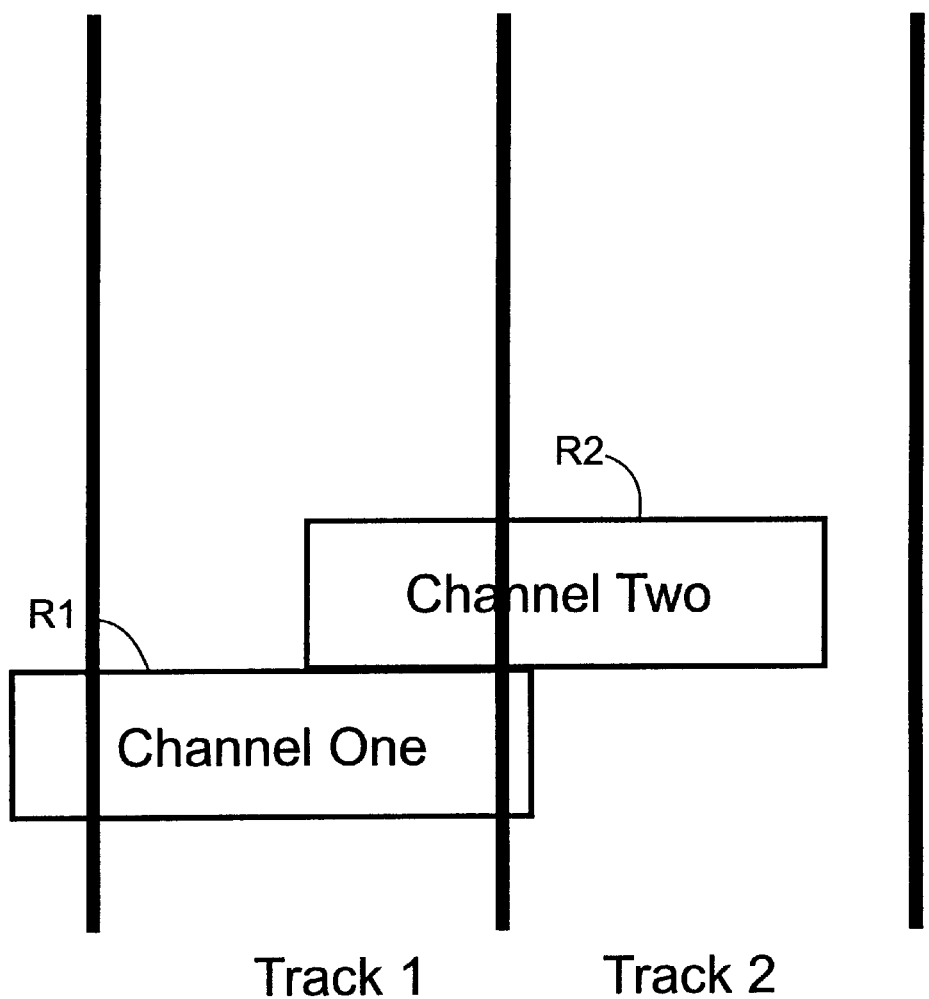
FIG. 4 is a schematic view of read heads of a narrow stripe format helical scan recorder following tracks of a broader stripe format helical scan recorder in a negative tracking error condition.

(2) Any signal loss from read head R2 is interpreted as meaning that heads R1, R2 are positioned too far to the left (see the negative tracking error condition depicted in FIG. 4). For small tracking errors, there is a loss in signal amplitude from only one of the two heads R1, R2. The technique of the present invention assumes that the maximum possible signal level from each read head R1, R2 is known, and that the position error is not too large. If the tracking error is small, the signals will still be of a sufficient amplitude to allow the data to be recovered.

Figure 6:
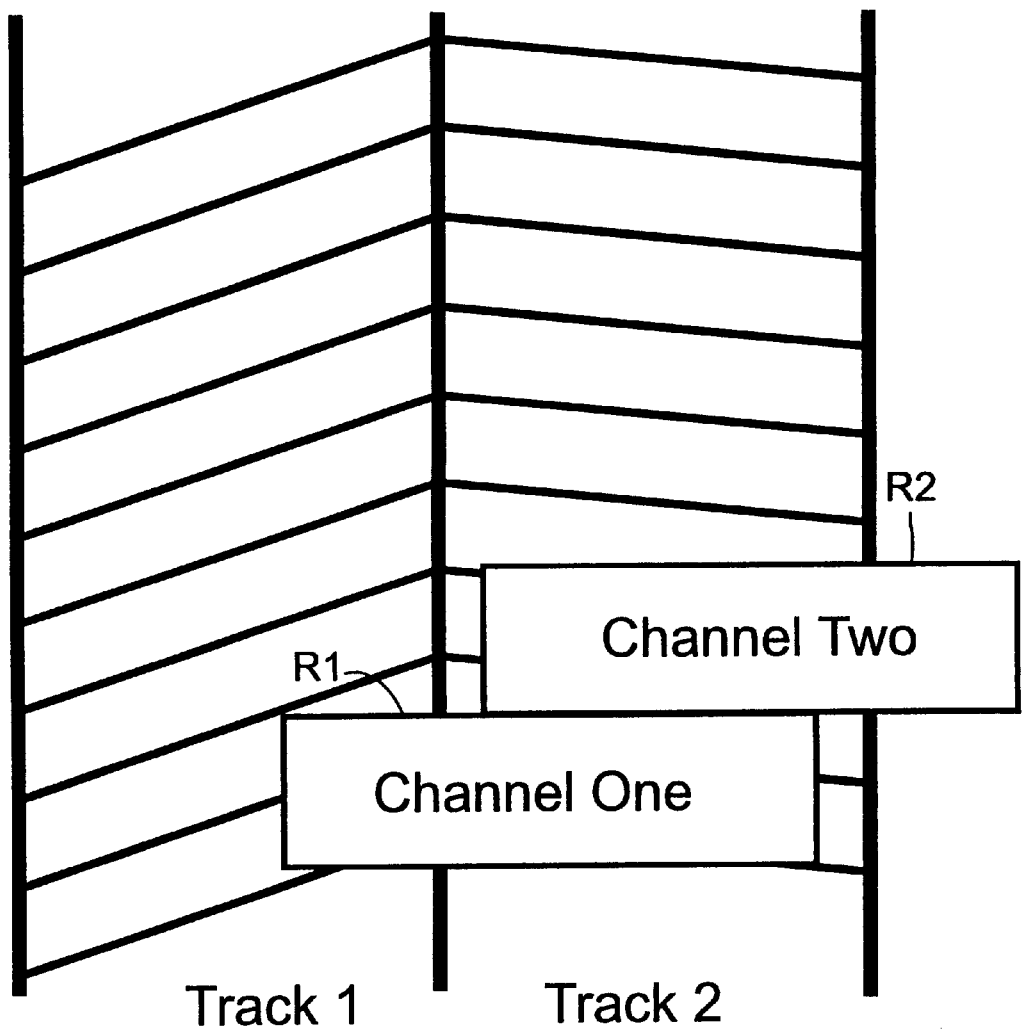
FIG. 6 is a schematic view of read heads of a narrow stripe format helical scan recorder following tracks of a broader stripe format helical scan recorder in a large positive tracking error condition.

In accordance with an enhancement of the invention, a second tracking rule or strategy is implemented. According to this second tracking rule:

(1) If the signal from read head R1 is below some threshold, then any signal loss (as compared to the maximum amplitude observed on that channel) from read head R2 is included with it's sign inverted (FIG. 6).

Figure 5:
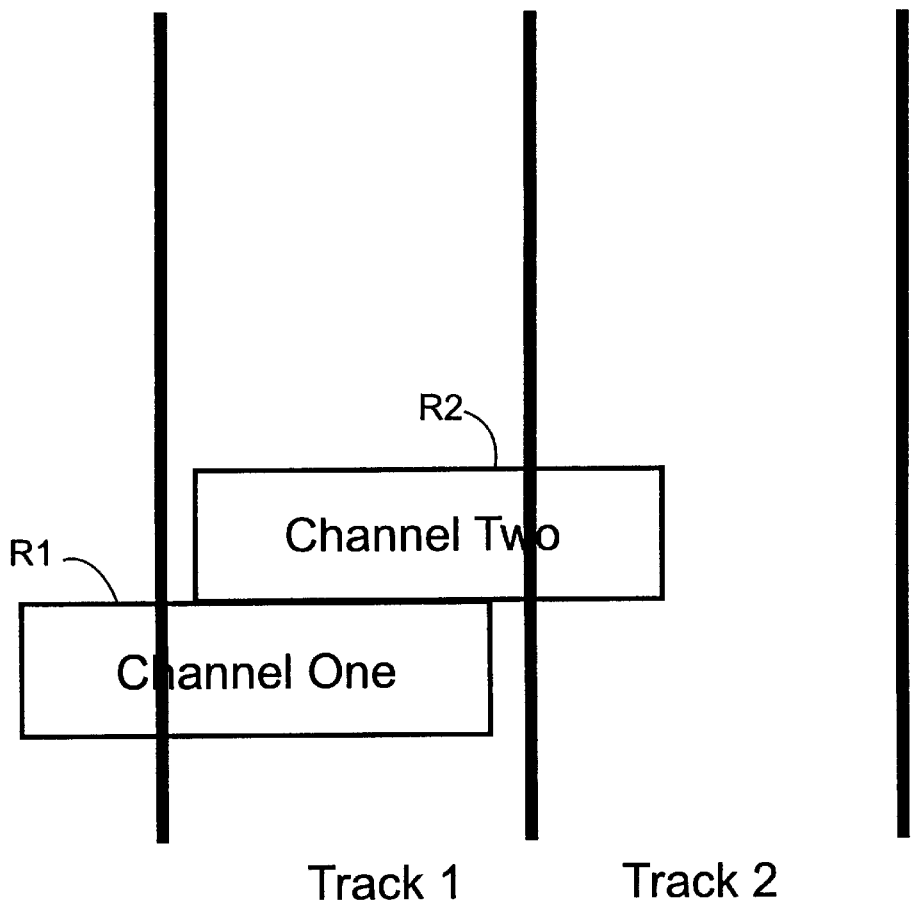
FIG. 5 is a schematic view of read heads of a narrow stripe format helical scan recorder following tracks of a broader stripe format helical scan recorder in a large negative tracking error condition.

(2) If the signal from read head R2 is below some threshold, then any signal loss (as compared to the maximum amplitude observed on that channel) from read head R1 is included with it's sign inverted (FIG. 5).

The rational behind this second rule is best understood by considering FIG. 5 and FIG. 6, as described below.

In FIG. 5, reads heads R1 and R2 are positioned so far to the left (a large negative tracking error condition) that read head R1 no longer fully overlaps non-native Track 1 and so produces a reduced signal amplitude. At the same time, the signal from read head R2 is much lower as it is substantially over non-native Track 1 from which it produces essentially no output. Only a small portion of read head R2 is positioned over non-native Track 2 and so the output is small. This very low amplitude from read head R2 that tells processor 50 to change its interpretation of the signal from read head R1. In this case the contribution of the signal from read head R1 will included with it's sign inverted.

A further improvement is obtained by realizing that under the large negative tracking error conditions noted with reference to FIG. 5 above, the small loss in amplitude from read head R1 is actually indicative of a much larger error than it does in the case of FIG. 3 (small positive error condition), and so it is multiplied by an appropriate gain factor.

FIG. 6 shows an analogous case for a large positive tracking errors. In FIG. 6, the low output from read head R1 is used to indicate that the small reduction in signal from read head R2 actually implies a large positive error.

The tracking method of the present invention does have the disadvantage that there is some amplitude loss for any non-zero error. However, if the magnitude of the amplitude loss is kept small by keeping the track error small the signals may be read with an acceptable error rate.

In order to determine the maximum amplitude, the peak output of both channels is continuously monitored. If at any time the output exceeds the known maximum value, a new maximum is recorded (FIG. 7). Since it is normal to cross over several tracks initially when trying to obtain tracking, a valid maximum amplitude can be quickly obtained.

FIG. 7 is a flowchart showing steps executed by processor 50 in accordance with the present invention. Coded instructions corresponding to the steps of FIG. 7 are stored in program memory 51 and executed by processor 50. In brief, the steps of FIG. 7 essentially develop a correction value "V" from the measured amplitudes "ch1_now" and "ch2_now", and the maximum values of those signals ("ch1_max" and "ch2_max"). The correction value V can also be thought of as the voltage applied to a motor controlling the relative position of the read heads over the tracks. Readers skilled in the art will recognize that some compensation will need to be applied to the signal V to avoid control loop instability and to update the old value as appropriate. This is done for read heads. Then, it is determined whether the error is large or small, based on the amplitude of each channel. It is possible that the head to track misalignment is so great that the output of both heads is below the aforementioned threshold. In this case, a correction in either direction is equally valid, and so an arbitrary fixed positive correction is applied. Finally, the correction value V is determined from one of three equations.

After starting (step 700), the routine of FIG. 7 compares the current value of the signal acquired from read head R1

(the value"ch1_now") with a stored maximum value (the value "ch1_max") [see step 701]. If the comparison of step 701 indicates that a new maximum value has been read from read head R1, the value"ch1_now" replaces the value "ch1_max" [step 702]. Similarly, at step 703 the current value of the signal acquired from read head R2 (the value "ch2_now") with a stored maximum value (the value "ch2_max"). If the comparison of step 703 indicates that a new maximum value has been read from read head R2, the value "ch2_now" replaces the value "ch2_max" [step 704].

At step 705 it is determined whether the value of "ch1_now" is less than a predetermined threshold (which is a fraction of the ch1_max value). If so, a large positive tracking condition is declared and the correction value "V" is calculated in accordance with Equation 1 as shown in FIG. 7, step 706.

$$V=K1*(ch1\_now-ch1\_max)+K2*(ch2\_now-ch2\_max) \quad \text{Equation 1:}$$

In Equation 1, K1 and K2 are constants.

At step 707 it is determined whether the value of "ch2_now" is less than a predetermined threshold (which is a fraction of the ch1_max value). If so, a large negative tracking condition is declared and the correction value "V" is calculated in accordance with Equation 2 as shown in FIG. 7, step 708

$$V=K1*(ch2\_max-ch2\_now)+K2*(ch1\_max-ch1\_now) \quad \text{Equation 2:}$$

If the determinations of both steps 705 and 707 are false, a small error tracking condition is assumed. In accordance with the small error tracking condition, at step 709 the correction value "V" is evaluated in accordance with Equation 3.

$$V=K1*(ch2\_max-ch2\_now)-K2*(ch1\_max-ch1\_now) \quad \text{Equation 3:}$$

Again it is mentioned that "V" represents the desired correction value. A value of "V" greater than zero requires that heads R1, R2 be moved to the right; A value of "V" less than zero requires that heads R1, R2 be moved to the left.

The correction value "V" can also be thought of as the voltage applied to a motor controlling the relative position of the read heads over the tracks. In the preferred embodiment, the speed of the takeup motor 96 is varied in order change the relative positions of the read heads to the tracks. Takeup motor 96 can be controlled by transport controller 98, and ultimately by a processor such as processor 50 or another processor such as a servo system processor.

The signal amplitude threshold used in steps 705 and 706 of FIG. 7 depends on the widths of both the non-native tracks and the read heads, and well as the distance between the two read heads. It is set slightly less than the amplitude that occurs on the channel 2 head when the alignment is such that the right side of the channel 1 head is coincident with the border between tracks 1 and 2 as shown in FIG. 4. In the ideal case this is the same amplitude that occurs in the channel 1 read head when the left side of the channel 2 read head is coincident with the border between tracks 1 and 2. Those skilled in the art will appreciate that head output depends on many factors including the characteristics of the head itself, and that there exists well known means to accommodate such variation.

The reader will understand in the foregoing that designations of "left" and "right" are arbitrarily chosen for purposes of illustration.

Advantageously, in the present invention it is not necessary to have a dedicated pilot signal. Because the relative alignment between the read heads and the tracks can be kept within acceptable limits, the tape may be consistently advanced at the desirable rate of two tracks per rotation of the drum. This is the fastest rate at which the tape may be advance without skipping any tracks. Prior art employs a slower "overscan" scheme typically running at ⅓ the desired tape speed, which results in considerably slower read performance when reading non-native tapes.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A tracking method for enabling a first read head and a second read head mounted on a drum of a helical scan tape drive to read non-native helical stripes recorded on a tape by another helical scan tape drive, the non-native helical stripes being wider than native stripes read by the first read head and the second read head, the method comprising:

transporting the tape at a linear velocity whereby the first head traverses a first non-native stripe and the second head traverses a second non-native stripe;

obtaining a first read signal from the first non-native stripe using the first read head and obtaining a second read signal from the second non-native stripe using the second read head;

if the first read signal is not less than a first predetermined threshold and the second read signal is not less than a second predetermined threshold, determining a correction value by:

(1) interpreting any signal loss from the first read head as meaning that the first read head and the second read head are positioned too far to a first direction;

(2) interpreting any signal loss from the second read head as meaning that the first read head and the second read head are positioned too far to a second direction;

if the first read signal is less than the first predetermined threshold, adding to the correction value any signal loss from the second read head with it's sign inverted; and if the second read signal is less than the second predetermined threshold, adding to the correction value any signal loss from the first read head with it's sign inverted; and using the correction value to control a relative position of the first read head and the second read head over the non-native helical stripes.

2. A tracking method for enabling a first read head and a second read head mounted on a drum of a helical scan tape drive to read non-native helical stripes recorded on a tape by another helical scan tape drive, the non-native helical stripes being wider than native stripes read by the first read head and the second read head, the method comprising:

transporting the tape at a linear velocity whereby the first head traverses a first non-native stripe and the second head traverses a second non-native stripe;

obtaining a first read signal from the first non-native stripe using the first read head and obtaining a second read signal from the second non-native stripe using the second read head;

when the first read signal is not less than a first predetermined threshold and the second read signal is not less than a second predetermined threshold, determining a correction value by:

(1) interpreting any signal loss from the first read head as meaning that the first read head and the second read head are positioned too far to a first direction;

(2) interpreting any signal loss from the second read head as meaning that the first read head and the second read head are positioned too far to a second direction; and using the correction value to control a relative position of the first read head and the second read head over the non-native helical stripes.

3. A tracking method for enabling a first read head and a second read head mounted on a drum of a helical scan tape drive to read non-native helical stripes recorded on a tape by another helical scan tape drive, the non-native helical stripes being wider than native stripes read by the first read head and the second read head, the method comprising:

transporting the tape at a linear velocity whereby the first head traverses a first non-native stripe and the second head traverses a second non-native stripe;

obtaining a first read signal from the first non-native stripe using the first read head and obtaining a second read signal from the second non-native stripe using the second read head;

adding to a correction value any signal loss from the second read head with it's sign inverted if the first read signal from the first read head is below a first predetermined threshold;

adding to the correction value any signal loss from the first read head with it's sign inverted if the second read signal from the second read head is below a second predetermined threshold; and using the correction value to control a relative position of the first read head and the second read head over the non-native helical stripes.

4. A helical scan tape drive which reads non-native stripes, the tape drive comprising:

a rotating drum having a first read head and a second read head positionably adjustably mounted thereon;

a tape transport for providing a linear velocity to a non-native tape, the tape having non-native helical stripes recorded thereon which are read by the first read head and the second read head, the non-native helical stripes having been recorded by another helical scan tape drive, the non-native helical stripes being wider than native stripes read by the first read head and the second read head, the linear velocity allowing the first head to traverse a first non-native stripe and the second head to traverse a second non-native stripe;

a processor which receives a first read signal acquired from the first non-native stripe by the first read head and a second read signal acquired from the second non-native stripe by the second read head and which uses any signal loss relative to an optimal tracking condition in one of the first read signal and the second read signal to determine a correction value and which uses the correction value to control a relative position of the first read head and the second read head over the non-native helical stripes;

the processor determining the correction value, when the first read signal is not less than a first predetermined threshold and the second read signal is not less than a second predetermined threshold, by:

(1) adding to the correction value any signal loss from the second read head with it's sign inverted if the signal from the first read head is below a first predetermined threshold;

(2) adding to the correction value any signal loss from the first read head with it's sign inverted if the signal from the second read head is below a second predetermined threshold the processor adding to the correction value any signal loss from the second read head with it's sign inverted if the first read signal from the first read head is below a first predetermined threshold;

the processor adding to the correction value any signal loss from the first read head with it's sign inverted if the second read signal from the second read head is below a second predetermined threshold.

5. A helical scan tape drive which reads non-native stripes, the tape drive comprising:

a rotating drum having a first read head and a second read head positionably adjustably mounted thereon;

a tape transport for providing a linear velocity to a non-native tape, the tape having non-native helical stripes recorded thereon which are read by the first read head and the second read head, the non-native helical stripes having been recorded by another helical scan tape drive, the non-native helical stripes being wider than native stripes read by the first read head and the second read head, the linear velocity allowing the first head to traverse a first non-native stripe and the second head to traverse a second non-native stripe;

a processor which receives a first read signal acquired from the first non-native stripe by the first read head and a second read signal acquired from the second non-native stripe by the second read head and which uses any signal loss relative to an optimal tracking condition in one of the first read signal and the second read signal to determine a correction value and which uses the correction value to control a relative position of the first read head and the second read head over the non-native helical stripes;

wherein the processor determines the correction value by:

(1) interpreting any signal loss from the first read head as meaning that the first read head and the second read head are positioned too far to a first direction;

(2) interpreting any signal loss from the second read head as meaning that the first read head and the second read head are positioned too far to a second direction.

6. A helical scan tape drive which reads non-native stripes, the tape drive comprising:

a rotating drum having a first read head and a second read head positionably adjustably mounted thereon;

a tape transport for providing a linear velocity to a non-native tape, the tape having non-native helical stripes recorded thereon which are read by the first read head and the second read head, the non-native helical stripes having been recorded by another helical scan tape drive, the non-native helical stripes being wider than native stripes read by the first read head and the second read head, the linear velocity allowing the first head to traverse a first non-native stripe and the second head to traverse a second non-native stripe;

a processor which receives a first read signal acquired from the first non-native stripe by the first read head and a second read signal acquired from the second non-native stripe by the second read head and which uses any signal loss relative to an optimal tracking condition in one of the first read signal and the second read signal to determine a correction value and which uses the correction value to control a relative position of the first read head and the second read head over the non-native helical stripes; the processor (1) adding to the correction value any signal loss from the second read head with it's sign inverted if the first read signal from the first read head is below a first predetermined threshold; and (2) adding to the correction value any signal loss from the first read head with it's sign inverted if the second read signal from the second read head is below a second predetermined threshold.

7. A tracking method for enabling a first read head and a second read head mounted on a drum of a helical scan tape drive to read helical stripes recorded on a tape, the method comprising:

transporting the tape past the drum whereby the first read head traverses a first stripe on the tape and the second read head traverses a second stripe on the tape;

using a first read signal obtained from the first stripe by the first read head and a second read signal obtained from the second stripe by the second read head to determine a correction value, the correction value being determined by inverting the second read signal when the first read signal is below a predetermined threshold; and using the correction value to control a relative position of the first read head and the second read head relative to the tape.

8. The method of claim 7, wherein the stripes read by the first read head and the second read head are non-native stripes recorded by another helical scan tape drive, the non-native helical stripes being wider than native stripes read by the first read head and the second read head.

9. The method of claim 7, wherein the step of determining the correction value comprises:

(1) interpreting any signal loss from the first read head as meaning that the first read head and the second read head are positioned too far to a first direction;

(2) interpreting any signal loss from the second read head as meaning that the first read head and the second read head are positioned too far to a second direction.

10. A helical scan tape drive which reads stripes recorded on a tape, the tape drive comprising:

a rotating drum having a first read head and a second read head mounted thereon;

a tape transport for transporting the tape whereby a first stripe is read by the first read head and a second stripe is read by the second read head;

a processor which receives a first read signal acquired from the first stripe by the first read head and a second read signal acquired from the second stripe by the second read head to determine a correction value, and which uses the correction value to control a relative position of the first read head and the second read head relative to the tape, the correction value being determined by inverting the second read signal when the first read signal is below a predetermined threshold.

11. The apparatus of claim 10, wherein the stripes read by the first read head and the second read head are non-native stripes recorded by another helical scan tape drive, the non-native helical stripes being wider than native stripes read by the first read head and the second read head.

12. The apparatus of claim 10, wherein the processor determines the correction value by:

(1) interpreting any signal loss from the first read head as meaning that the first read head and the second read head are positioned too far to a first direction;

(2) interpreting any signal loss from the second read head as meaning that the first read head and the second read head are positioned too far to a second direction.

13. A tracking method for enabling a first read head and a second read head mounted on a drum of a helical scan tape drive to read non-native helical stripes recorded on a tape by another helical scan tape drive, the non-native helical stripes being wider than native stripes read by the first read head and the second read head, the method comprising:

transporting the tape at a linear velocity whereby the first head traverses a first non-native stripe and the second head traverses a second non-native stripe;

obtaining a first read signal from the first non-native stripe by the first read head and obtaining a second read signal obtained from the second non-native stripe by the second read head and using any signal loss relative to an optimal tracking condition in one of the first read signal and the second read signal to determine a correction value; the optimal tracking condition occurring when a first edge of the first read head is aligned with a first edge of the first non-native stripe and a second edge of the second read head is aligned with a second edge of the second non-native stripe; and using the correction value to control a relative position of the first read head and the second read head over the non-native helical stripes.

14. The method of claim 13, wherein the step of determining the correction value comprises:

(1) interpreting any signal loss from the first read head as meaning that the first read head and the second read head are positioned too far to a first direction;

(2) interpreting any signal loss from the second read head as meaning that the first read head and the second read head are positioned too far to a second direction.

15. The method of claim 13, wherein the step of determining the correction value comprises:

(1) adding to the correction value any signal loss from the second read head with it's sign inverted if the signal from the first read head is below a first predetermined threshold; and (2) adding to the correction value any signal loss from the first read head with it's sign inverted if the signal from the second read head is below a second predetermined threshold.

16. The method of claim 13, wherein the optimal tracking condition occurs when the first edge of the first read head is a left edge of the first read head and the first edge of the first non-native stripe is a left edge of the first non-native stripe; and the second edge of the second read head is the right edge of the second read head and the second edge of the second non-native stripe is the right edge of the second non-native stripe.

17. A helical scan tape drive which reads non-native stripes, the tape drive comprising:

a rotating drum having a first read head and a second read head positionably adjustably mounted thereon;

a tape transport for providing a linear velocity to a non-native tape, the tape having non-native helical stripes recorded thereon which are read by the first read head and the second read head, the non-native helical stripes having been recorded by another helical scan tape drive, the non-native helical stripes being wider than native stripes read by the first read head and the second read head, the linear velocity allowing the first head to traverse a first non-native stripe and the second head to traverse a second non-native stripe;

a processor which receives a first read signal acquired from the first non-native stripe by the first read head and a second read signal acquired from the second non-native stripe by the second read head and which uses any signal loss relative to an optimal tracking condition in one of the first read signal and the second read signal to determine a correction value and which uses the correction value to control a relative position of the first read head and the second read head over the non-native helical stripes; the optimal tracking condition occurring when a first edge of the first read head is aligned with a first edge of the first non-native stripe and a second edge of the second read head is aligned with a second edge of the second non-native stripe.

18. The apparatus of claim 17, wherein the processor determines the correction value by:
(1) interpreting any signal loss from the first read head as meaning that the first read head and the second read head are positioned too far to a first direction;
(2) interpreting any signal loss from the second read head as meaning that the first read head and the second read head are positioned too far to a second direction.

19. The apparatus of claim 17, wherein the processor determines the correction value by:

(1) adding to the correction value any signal loss from the second read head with it's sign inverted if the signal from the first read head is below a first predetermined threshold;
(2) adding to the correction value any signal loss from the first read head with it's sign inverted if the signal from the second read head is below a second predetermined threshold.

20. The apparatus of claim 17, wherein the optimal tracking condition occurs when the first edge of the first read head is a left edge of the first read head and the first edge of the first non-native stripe is a left edge of the first non-native stripe; and the second edge of the second read head is the right edge of the second read head and the second edge of the second non-native stripe is the right edge of the second non-native stripe.

* * * * *